June 9, 1953  C. BANCROFT  2,641,480
BANKING AUTOMOTIVE VEHICLE

Filed July 29, 1950  5 Sheets-Sheet 1

INVENTOR.
CHARLES BANCROFT
BY
Kenyon & Kenyon
ATTORNEYS

INVENTOR.
CHARLES BANCROFT
BY
Kenyon & Kenyon
ATTORNEYS

June 9, 1953  C. BANCROFT  2,641,480
BANKING AUTOMOTIVE VEHICLE
Filed July 29, 1950  5 Sheets-Sheet 3
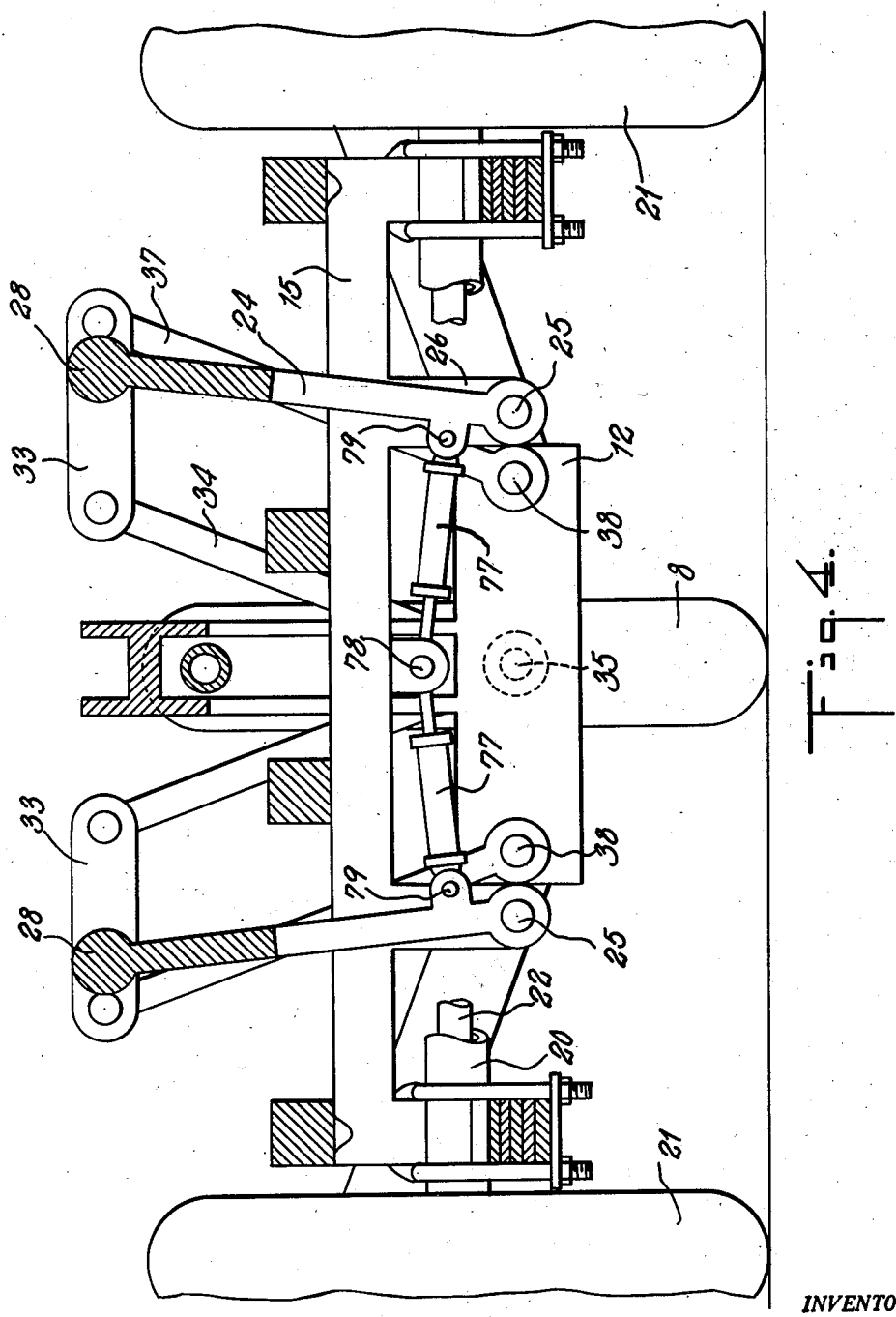
INVENTOR:
CHARLES BANCROFT
BY
Kenyon & Kenyon
ATTORNEYS

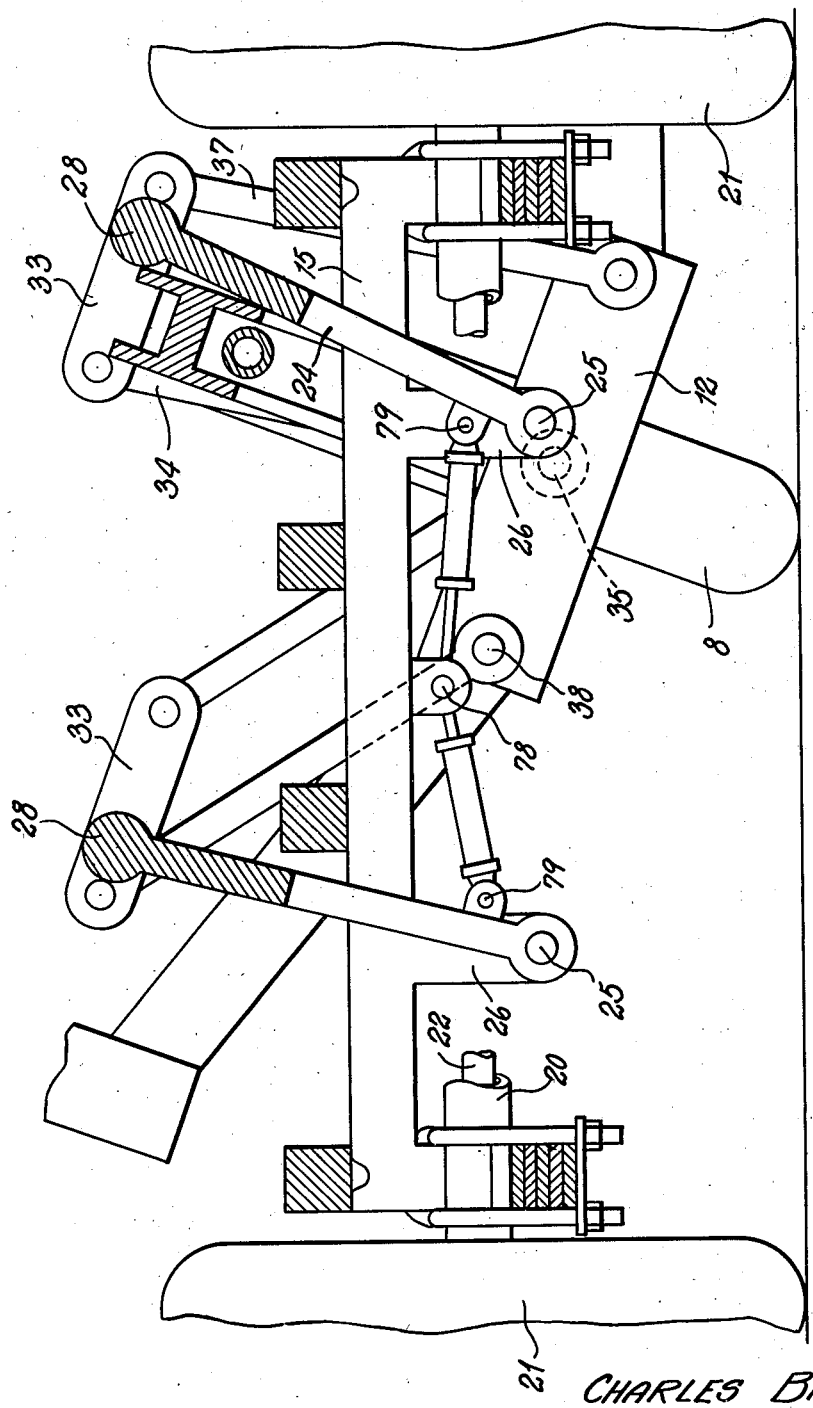

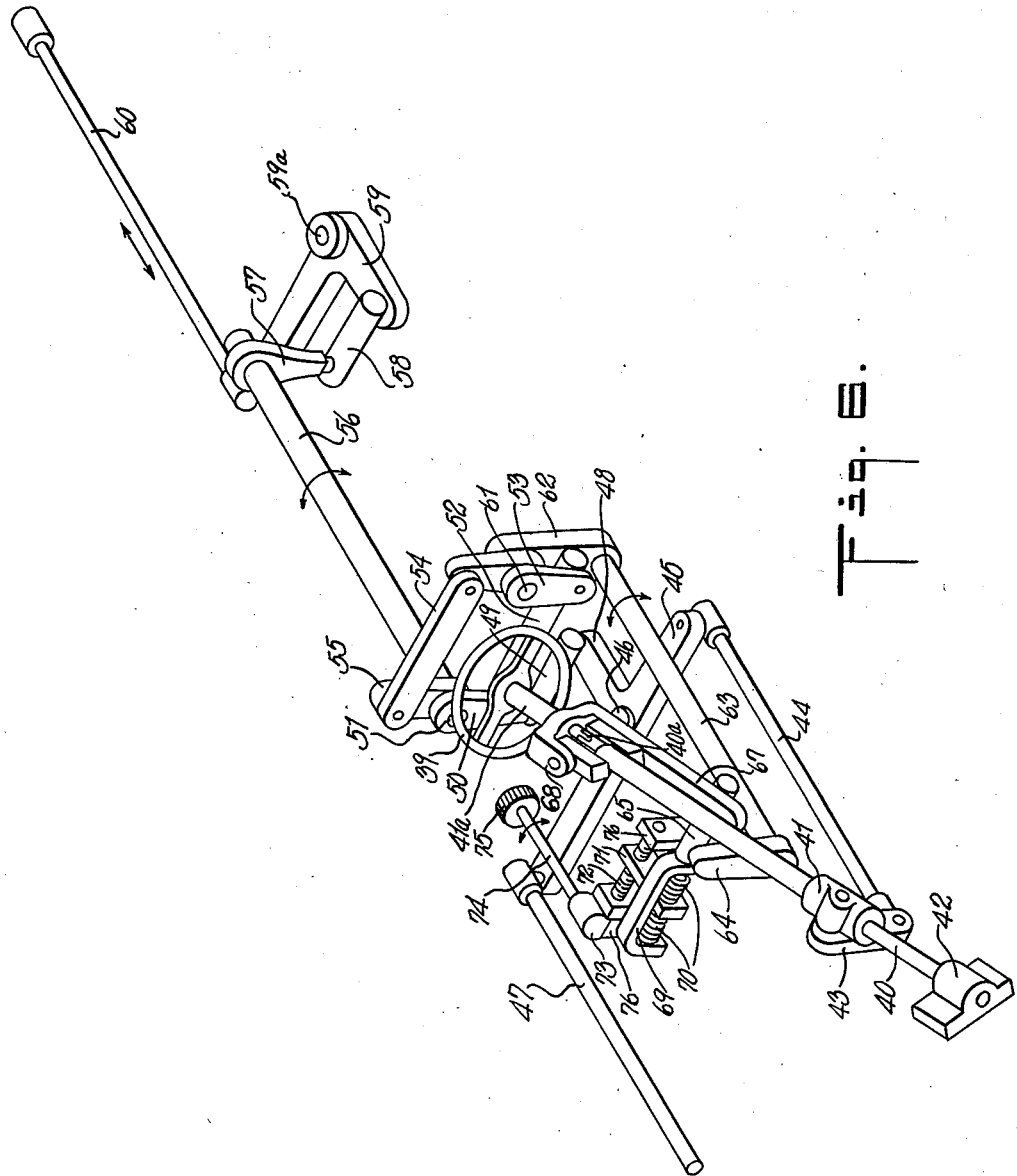

Patented June 9, 1953

2,641,480

UNITED STATES PATENT OFFICE 2,641,480

BANKING AUTOMOTIVE VEHICLE

Charles Bancroft, New Canaan, Conn.

Application July 29, 1950, Serial No. 176,746

6 Claims. (Cl. 280—87)

This invention relates to automotive vehicles, one object being to provide a vehicle having vertical stability, whether in motion or at rest, yet which is capable of banking in turns and assuming at all times the correct degree of bank needed to cancel out lateral forces caused by centrifugal force generated in turns or by slope of the ground.

Some of the advantages resulting from this are that passengers are not thrown sideways in the vehicle when turns are taken at high speed, the vehicle is virtually impossible to tip over and is capable of negotiating curves comfortably and safely at higher speeds than is now the case with vehicles which cannot bank.

Vertical stability of the vehicle, as contemplated by this invention, is provided by a set of laterally spaced wheels centrally mounted to the vehicle and so linked to it as to be capable of lateral movement with respect thereto. In addition, the linkage is such that as these wheels are moved to the right or left of the longitudinal center line of the vehicle, their vertical angular relation with it changes so that, while the vehicle is maintained in an upright position with regard to the supporting surface when the wheels are centered, it is caused to tilt to the right or left with regard to the ground whenever the wheels are moved to the left or right with regard to said central position. Thus, if the wheels are moved to the left of center, the vehicle will be forced to assume a corresponding tilt to the right with regard to the ground, or vice-versa.

Additional steerable wheels are provided as single wheels on the longitudinal center line and at the front and rear of the vehicle, and the steering control of these wheels is so linked together that the rear wheel will generally track the front wheel as the vehicle progresses. However, means are also provided so that, either by the driver's intent or as the result of forces built up during operation of the vehicle, as described hereafter, the rear wheel can have its angular steering relationship to the front wheel altered so that it will not track the front wheel exactly during motion of the vehicle.

Since the center wheels of the vehicle are maintained always parallel with the longitudinal axis or center line of the vehicle and are therefore, in effect, steered by altering the direction of said longitudinal axis of the vehicle, changes in the steering relationship of the rear wheel with respect to the front wheel will have the effect of steering the middle wheels so that, as the steering of the rear wheel is changed with respect to the front wheel, the track followed by the center wheels will tend to go to the left or right of that taken by the front wheel, thereby tending to shift these center wheels to the right or left side of the vehicle which, in turn, will cause the vehicle to tilt to the left or right. Thus, by varying the steering angle of the rear wheel with respect to the front wheel, the vehicle described herein can be caused to tilt in any desired or required direction.

If the steering caster of the rear wheel is such that lateral pressure exerted on the vehicle, such as would be caused by centrifugal force in a turn, has a tendency to turn the rear wheel so that its trailing edge goes in the direction of this lateral force, such centrifugal force in a turn will have a tendency to force the rear wheel out of track with the front wheel in such a direction as will cause the middle wheels to shift laterally with respect to the vehicle so as to tilt the vehicle in the required direction to neutralize this lateral force. The vehicle can thus be arranged to automatically assume a correct attitude for balance and comfort in any turn, or on a slanting road, without attention from the driver.

Since, conversely, uneven weight distribution within the vehicle will have a tendency to tilt the vehicle, thereby creating a thrust tending to steer the rear wheel in such a direction as to steer the vehicle in a curve in the direction of the uneven weight, this being a result of the rear end, in effect, sliding away from the weighted side, and since this will, in turn, cause lateral movement of the middle wheels which will result in the heavy side of the vehicle being tilted up until the effect of the extra weight is neutralized (as in motorcycle operation); in order that the vehicle may be operated as it would be if weight distribution were equal, regardless of actual weight distribution, a trim control is included to provide a steering tendency, of the rear wheel, opposite to that resulting from such uneven weight distribution. Such a trim control may consist of a manually variable means of creating a tendency of the rear wheel to diverge from the track of the front wheel in one direction or the other. Such a control could, of course, also be operated in conjunction with such instruments as are commonly employed in the automatic pilots of aircraft for automatic operation.

As shown in the accompanying drawings, normal steering of the vehicle by the driver is accomplished by turning the steering wheel which firmly controls the front wheel. Tilting of the steering wheel to the right or left varies the steering of the rear wheel with respect to the front wheel. If the steering wheel is not permitted to tilt, the rear wheel must steer with the front wheel so that it will track it. As in an airplane, the wheel is not tilted except when the rate of bank of the vehicle is being changed. Thus once the proper bank for a given speed and turn has been established, the wheel returns to level and remains there so long as conditions do not change. Thus the control wheel is only tilted, whether operating automatically or otherwise, when an actual change in amount or direction of bank is taking place.

One specific example of a vehicle, of the character described, is illustrated by the accompanying drawings. In these drawings the passenger-carrying body and the motor are eliminated so that the details of construction may be clearly seen. The various figures are as follows:

Fig. 4 is a vertical cross section taken on the line 4—4 in Fig. 3.

Fig. 5 is a view similar to Fig. 4 but showing the banking action, the vehicle being level in Fig. 4.

Fig. 6 shows the steering system of the vehicle.

Figure 1:
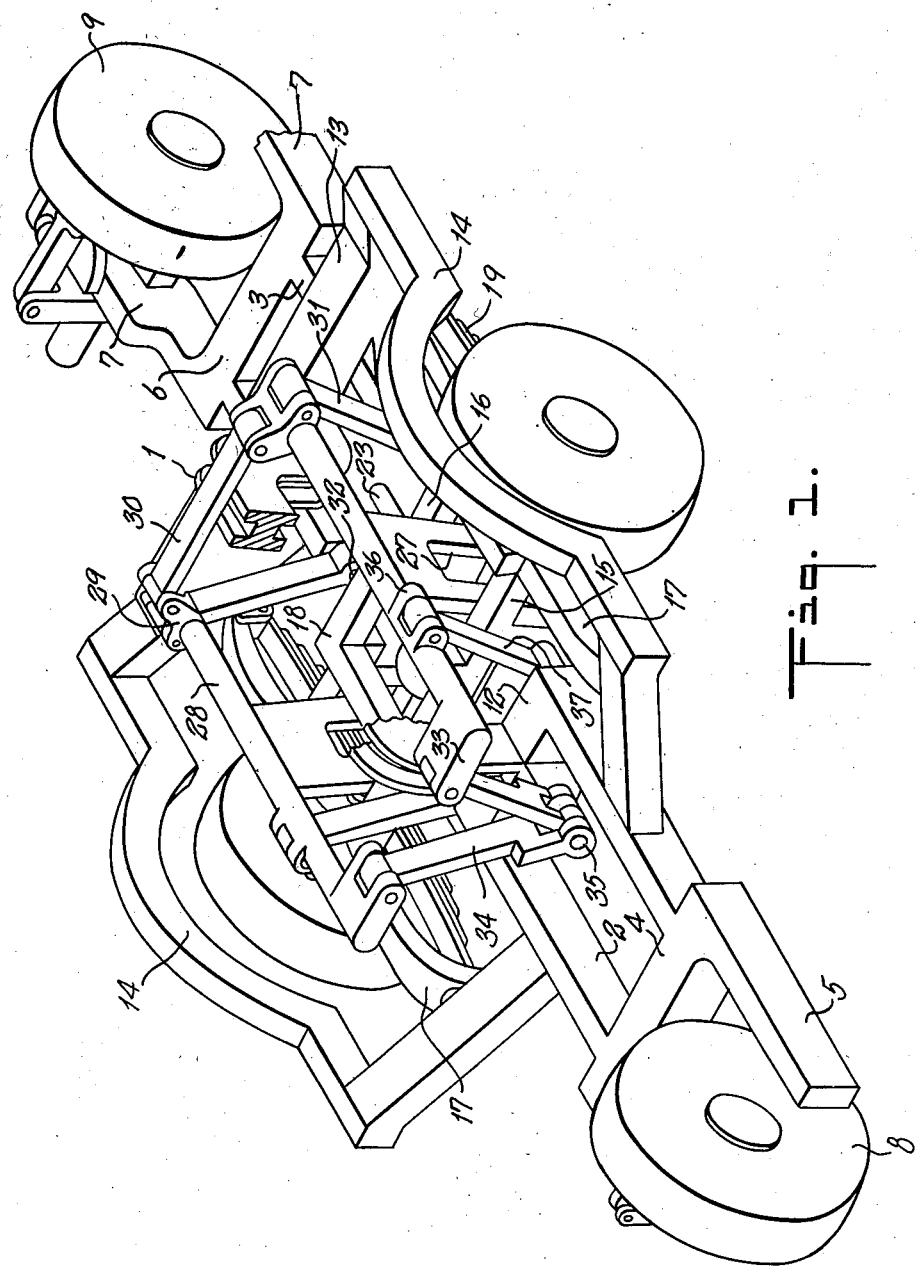
Fig. 1 is an isometric view of the vehicle with the steering system eliminated to avoid obscuring certain parts.
Figure 2:
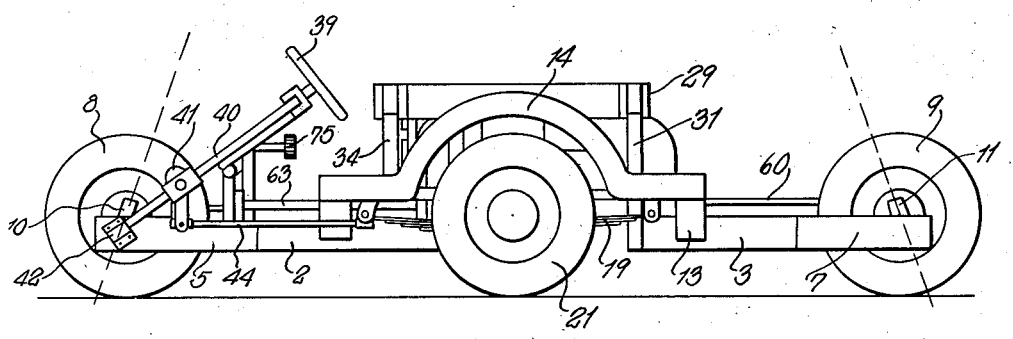
Fig. 2 is a side view.
Figure 3:
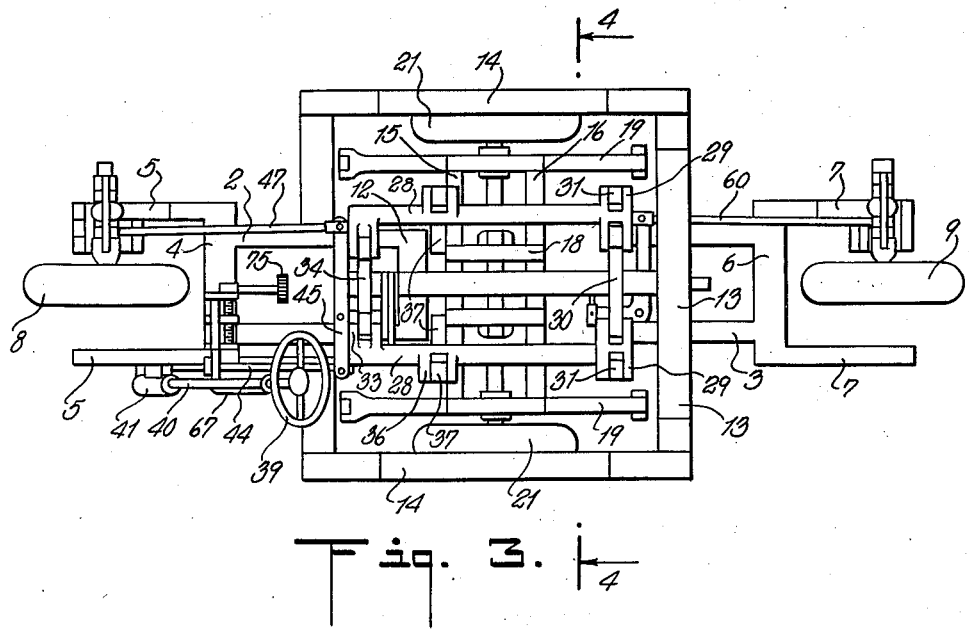
Fig. 3 is a top view.

Having reference to these drawings, the vehicle has a main frame including a central upstanding arch 1 from the front of which a rectangular frame 2 extends forwardly, and from the rear of which a rectangular frame 3 extends backwardly. The front bar 4 of the frame 2 projects outwardly beyond the frame and forwardly to provide fork arms 5. The rear bar 6 of the rear rectangular frame 3 is similarly designed to provide backwardly extending fork arms 7. One of the front fork arms 5 journals the front wheel 8, and one of the rear fork arms 7 journals the rear wheel 9. These wheels 8 and 9 are arranged on the longitudinal center line or axis of the vehicle. The wheels may be mounted through knee-action spring suspensions (not shown) and they are mounted so that they can both steer. The wheels may both be mounted like the front wheels of a motorcycle, if desired. The pivot pins or kingpins, generally indicated at 10 and 11 for the front and rear wheels, respectively, are provided with casters tending to make the front wheel steer straight ahead, and to give the rear wheel a tendency to be automatically steering. The general caster angles are indicated in Fig. 2. Lateral force on the rear of the vehicle causes the rear wheel to steer into the direction of the force.

The front rectangular frame 2 connects with the front of the arch 1 by way of a cross bar 12, and the rear rectangular frame 3 connects with the rear end of this arch 1 by way of a cross bar 13. The main frame may include other parts, such as the side structures 14, to facilitate the mounting of a body. This main frame is the one which tilts to provide the described banking action. In some instances, the body itself may incorporate a frame as an integral part.

A subframe for mounting the center, shiftable, set of wheels is connected with this main frame so that when the center wheels shift laterally respecting the main frame the latter is tilted.

This subframe includes front and rear, mutually spaced, transversely extending bars 15 and 16 respectively, which are mounted by laterally spaced, spring horns 17 which extend longitudinally of the vehicle. These cross bars 15 and 16 are provided with a centrally positioned, rectangular frame 18 which may be integral with the bars 15 and 16. As shown, the rear cross bar 16 is discontinued beneath the frame 18 to form an arch effect, while the front cross bar 15 is a continuing part. Semi-elliptical leaf springs 19 mount the ends of the spring horns 17 in the conventional fashion, and a wheel axle housing 20 supports the central portions of these springs 19. The two central wheels 21 are mounted by the axle 22 extending through the housing 20. Although not clearly shown, the axle housing 20 may be like the rear end of a conventional automobile, including a differential gearing and housing from which a drive shaft, indicated at 23, may extend rearwardly for powering by a motor.

A lever system interconnects the main frame and subframe. This lever system includes a pair of laterally spaced upstanding compression plates 24 which are connected by pivots 25 with columns 26 which depend rigidly from the subframe cross bars 15 and 16. These compression plates have upstanding slots 27 providing clearance for the axle housing 20, which the plates' forked ends straddle.

The upper ends of these compression plates 24 rigidly mount bars 28 extending longitudinally of the vehicle partially over the front and rear rectangular frames of the main frame. At their rear ends these bars 28 rigidly mount bell cranks 29 which have upwardly extending arms interconnected by a cross link 30 and outwardly extending arms which are connected by links 31 with the main frame by pivots 32 at laterally spaced locations on the main frame.

The front ends of the longitudinally extending bars 28 have inwardly extending levers 33 which are rigid respecting the bars 28. The inner ends of these levers 33 are connected by links 34 with a common pivot 35 which pivots them to the rear transverse bar 12 of the main frame's front rectangular frame 2 and on the center line or axis of the main frame. Behind the levers 33, the bars 28 have outwardly extending stub levers 31 which are rigid respecting the bars 28. Links 37 depend from these stub levers 36 to pivot pins 38 connecting them at laterally spaced points with the rear of the cross bar 12 of the front rectangular frame 2.

The lever and link system described, functions as a pantograph so that, as shown in Fig. 4, when the subframe is centrally located respecting the main frame, the main frame is held in a horizontal position. When the subframe shifts to the left of the main frame, the main frame is tilted to the right respecting the ground, this being shown by Fig. 5. When the subframe shifts to the right of the main frame the main frame is tilted to the left.

Shifting of the subframe relative to the main frame may be accomplished by power-operated means controlled either manually or automatic. Shifting may also be accomplished by the manner in which the vehicle is steered, if provision is made for this purpose.

The steering mechanism may be more easily understood by referring to Fig. 6. A steering wheel 39 turns a steering column 40 mounted by the casing of a worm and sector steering gear 41 and a bearing 42. This casing and the bearing may be mounted by the main frame of the vehicle. The steering gear 41 works an arm 43 in the usual fashion, this arm moving a link 44 which rocks a lever 45 which is mounted to the main frame by a pivot 46. The lever 45 projects beyond the pivot 46 and connects with a link 47 which goes to the front wheel 8 so as to steer it in the usual fashion. The lever 45 includes a transverse arm 48 which connects by a link 49 with a lever 50 which swings on a fixed pivot 51. A link 52 connects the lever 50 with one arm of a two-armed lever 53, the other arm of this lever connecting with a link 54 which swings a lever 55 which turns a shaft 56. This shaft 56 is mounted by the main frame of the vehicle so that it can rotate but so that its axis remains fixed at all times. For convenience, the forward end of this shaft 56 provides the pivot 51 but the lever 50 swings independently of the shaft 56. The rear end of this shaft 56 swings a lever 57 which connects through a link 58 with one arm of a bell crank 59 pivoted to the main frame by a pivot 59a, the other arm of this bell crank connecting through a link 60 with the rear wheel so as to steer the same.

Now the two-armed lever 53 is pivotally mounted by a pivot pin 61. When this pivot pin is held with its axis fixed the front and rear wheels of the vehicle are simultaneously steered in opposite directions in equal amounts. Therefore, under such circumstances the front and rear wheels cause the vehicle to go around a curve by pivoting on the subframe and the set of central wheels. However, shifting of the pivot pin 61 causes the rear wheel to be steered unequal amounts respecting the front wheel. When this is done the center wheels are steered to the right of the left of the vehicle so as to tilt the main frame of the vehicle through the pantograph system which interconnects the two frames.

Shifting of the pivot 61 is accomplished by mounting this pivot on the end of a lever 62 which is turned by a shaft 63 provided with a turning arm 64. This arm 64 connects with a link 65 which is moved by a lever 67 connecting with a top section 41a of the steering column housing 41. This top section 41a connects with the lower section 41 through a pivot joint 68. A universal joint 40a properly transmits rotary motion from the wheel 39 to the steering column 40 during such tilting. The arrangement is such that rotation only of the steering wheel 39, without tilting the wheel, causes equal steering of the front and rear wheels. When the wheel is tilted without rotation only the rear wheel is steered, due to shifting of the pivot 61. Combination rotation and tilting of the steering wheel results in simultaneous unequal steering of the front and rear wheels.

With the described steering arrangement the operator of the vehicle can tilt the steering wheel 39 one way or the other as required to steer the shiftable center wheels to the right or left so as to tilt the main frame of the vehicle in the desired direction. Guiding of the rear wheel respecting the front wheel causes the vehicle to travel obliquely, so as to guide the central wheels to cause them to shift laterally. This action tends to steer the rear of the vehicle, but this tendency can be overcome by simultaneous rotation of the steering wheel 39 in the proper direction. In negotiating a curve the driver may both turn and tilt the steering wheel as required to make the curve and also bank the main frame of the vehicle in the appropriate direction.

Due to the caster of the rear wheel this wheel will naturally tend to guide itself by the lateral centrifugal force resulting when the vehicle is made to go around a curve. This guiding tendency automatically causes the rear wheels to steer somewhat unequally respecting the front one and in a direction shifting the subframe in the proper direction to provide the proper banking.

Uneven weight distribution on the vehicle will also have a tendency to steer the rear wheel. This tendency can be overcome by the driver applying proper force to the steering wheel. The drawings illustrate another way of overcoming this tendency. This is by providing the link 65 with a bracket 69 which encompasses two aligned compression springs 70 which work against an abutment bar 71. When this abutment bar is centrally positioned, respecting the brackets, the compression of the springs 70 balance. When this abutment bar 71 is shifted one way or another a spring-bias is applied to the link 65 which may be used to overcome the self-steering tendency of the rear wheel induced by an offset weight application to the main frame. This bar 71 is engaged by a screw 72 which may be turned through a gearing 73 by a shaft 74 provided with a manually operable knob 75 positioned conveniently to the driver of the vehicle. Should the driver find that he must continually apply force to the steering wheel 39 to overcome a tendency for the vehicle to bank, he can turn the knob 75 in the proper direction to shift the abutment bar 71 in a direction applying spring-bias to the link 65 sufficient to overcome the self-steering tendency. The screw shaft 72 is journaled by brackets 76 which may be mounted by the main frame of the vehicle.

Under some circumstances it may prove desirable to use shock absorbers or the like for preventing excessively rapid lateral shifting of the shiftable subframe. Figures 4 and 5 illustrate plunger-type shock absorbers 77 pivoted at 78 to the main frame and at 79 to the compression plates 24 close to the latter's pivots 25 which connect with the subframe. Such an arrangement may be used to retard excessively rapid subframe shifting action.

I claim:

1. A vehicle, a plurality of wheels, means for pivotally connecting said wheels to said vehicle with said wheels located one behind the other in substantial alignment with each other and so that said wheels may be steered, a set of laterally spaced wheels located between the first-named wheels, means for connecting said set to said vehicle so that said set may shift laterally relative to said vehicle and for supporting said vehicle on and relative to said set with an angularity relative to said set which is dependent automatically on the lateral position of said set relative to said vehicle, and means for steering the first-named wheels to respectively different steering angles relative to said vehicle whereby to cause lateral shifting of said set relative to said vehicle when said vehicle is moving.

2. A vehicle including a main frame, a subframe, means for interconnecting said frames so that they are substantially immovable longitudinally and are shiftable laterally respecting each other, means for holding said frames substantially parallel to each other when said subframe is located at a predetermined lateral position relative to said main frame and for translating motion of said subframe laterally from said position into tilting motion of said main frame relative to said subframe, laterally spaced wheels connected to said subframe to support it laterally stably relative to a supporting surface, front and rear wheels, means for pivotally steeringly connecting said front and rear wheels to said main frame respectively in front of and behind said subframe and substantially in alignment with each other longitudinally respecting said main frame, and means for oppositely steering said front and rear wheels to respectively different steering angles relative to said main frame.

3. A vehicle including a main frame, a subframe, means for interconnecting said frames so that they are substantially immovable longitudinally and are shiftable laterally respecting each other, means for holding said frames substantially parallel to each other when said subframe is located at a predetermined lateral position relative to said main frame and for translating motion of said subframe laterally from said position into tilting motion of said main frame relative to said subframe, laterally spaced wheels connected to said subframe to support it laterally stably relative to a supporting surface, front and rear wheels, means for pivotally steeringly connecting said front and rear wheels to said main frame respectively in front of and behind said subframe and substantially in alignment with each other longitudinally respecting said main frame, means for oppositely steering said front and rear wheels to corresponding steering angles relative to said main frame, and means for steering at least one of said front and rear wheels to a steering angle relative to said frame that is different from the steering angle relative to said frame of the other of said front and rear wheels.

4. A vehicle including a main frame, a subframe, means for interconnecting said frames so that they are substantially immovable longitudinally and are shiftable laterally respecting each other, means for holding said frames substantially parallel to each other when said subframe is located at a predetermined lateral position relative to said main frame and for translating motion of said subframe laterally from said position into tilting motion of said main frame relative to said subframe, laterally spaced wheels connected to said subframe to support it laterally stably relative to a supporting surface, front and rear wheels, means for pivotally steeringly connecting said front wheel to said main frame and means for pivotally steeringly connecting said rear wheel to said main frame, respectively in front of and behind said subframe and with said front and rear wheels substantially in alignment with each other longitudinally respecting said main frame, means for oppositely steering said front and rear wheels to corresponding steering angles relative to said main frame, and means for steering said rear wheel to different steering angles relative to said main frame respecting the steering angle of said front wheel, said rear wheel being pivoted to said main frame with a backward castor angle by said means for pivotally steeringly connecting said rear wheel to said main frame.

5. A vehicle including a main frame, a subframe, means for interconnecting said frames so that they are substantially immovable longitudinally and are shiftable laterally respecting each other, means for holding said frames substantially parallel to each other when said subframe is located at a predetermined lateral position relative to said main frame and for translating motion of said subframe laterally from said position into tilting motion of said main frame relative to said subframe, laterally spaced wheels connected to said subframe to support it laterally stably relative to a supporting surface, front and rear wheels, means for pivotally steeringly connecting said front wheel to said main frame and means for pivotally steeringly connecting said rear wheel to said main frame, respectively in front of and behind said subframe and with said front and rear wheels substantially in alignment with each other longitudinally respecting said main frame, means for oppositely steering said front and rear wheels to corresponding steering angles relative to said main frame, and means for steering said rear wheel to different steering angles relative to said main frame respecting the steering angle of said front wheel, said rear wheel being pivoted to said main frame with a backward castor angle by said means for pivotally steeringly connecting said rear wheel to said main frame, said rear wheel having means for biasing it to steer towards a predetermined steering angularity relative to said frame.

6. A vehicle including a main frame, a subframe, means for interconnecting said frames so that they are substantially immovable longitudinally and are shiftable laterally respecting each other, means for holding said frames substantially parallel to each other when said subframe is located at a predetermined lateral position relative to said main frame and for translating motion of said subframe laterally from said position into tilting motion of said main frame relative to said subframe, laterally spaced wheels connected to said subframe to support it laterally stably relative to a supporting surface, front and rear wheels, means for pivotally steeringly connecting said front and rear wheels to said main frame respectively in front of and behind said subframe and substantially in alignment with each other longitudinally respecting said main frame, and means for oppositely steering said front and rear wheels to respectively different steering angles relative to said main frame, and shock absorber means for retarding rapid lateral shifting of said frames relative to each other.

CHARLES BANCROFT.

References Cited in the file of this patent

UNITED STATES PATENTS

| Number | Name | Date |
|---|---|---|
| 932,333 | Schmelz | Aug. 24, 1909 |
| 2,029,735 | Minott | Feb. 4, 1936 |
| 2,067,546 | Rocher | Jan. 12, 1937 |
| 2,076,722 | Heinze | Apr. 13, 1937 |
| 2,111,983 | Massey | Mar. 22, 1938 |
| 2,216,930 | Altemers | Oct. 8, 1940 |
| 2,234,676 | Kolbe | Mar. 11, 1941 |
| 2,485,770 | Place | Oct. 25, 1949 |